United States Patent [19]

Bevers et al.

[11] Patent Number: 5,761,793
[45] Date of Patent: Jun. 9, 1998

[54] PROCESS FOR THE PRODUCTION OF A COMPOSITE CONSISTING OF ELECTRODE MATERIAL, CATALYST MATERIAL AND A SOLID-ELECTROLYTE MEMBRANE

[75] Inventors: Dirk Bevers, Boeblingen; Norbert Wagner, Sindelfingen, both of Germany

[73] Assignee: Deutsche Forschungsanstalt fuer Luft- und Raumfahrt e.V., Bonn, Germany

[21] Appl. No.: 616,730

[22] Filed: Mar. 15, 1996

[30] Foreign Application Priority Data

Mar. 17, 1995 [DE] Germany .......... 195 09 749.1

[51] Int. Cl.$^6$ .................. H01M 8/02; H01M 8/10
[52] U.S. Cl. .................... 29/623.5; 29/623.3
[58] Field of Search ................ 29/623.3, 623.5

[56] References Cited

U.S. PATENT DOCUMENTS

| | | | |
|---|---|---|---|
| 5,100,746 | 3/1992 | Muller et al. | 29/623.5 X |
| 5,290,642 | 3/1994 | Minh et al. | 29/623.3 X |
| 5,536,278 | 7/1996 | St-Amant et al. | 29/623.3 |

FOREIGN PATENT DOCUMENTS

| | | |
|---|---|---|
| 0 043 632 | 1/1982 | European Pat. Off. . |
| 33 32 566 | 3/1985 | Germany . |
| 29 25 349 | 3/1988 | Germany . |
| 42 41 150 | 6/1994 | Germany . |
| 44 19 383 | 3/1995 | Germany . |

*Primary Examiner*—John S. Maples
*Attorney, Agent, or Firm*—Barry R. Lipsitz; Ralph F. Hoppin

[57] ABSTRACT

In order to improve a process for the production of a composite consisting of electrode material, catalyst material and a solid-electrolyte membrane for an electrochemical cell, in particular a fuel cell, with which solid-electrolyte material is brought into pore-deep contact with the electrode material and the catalyst material by softening it, such that this can be carried out as effectively and inexpensively as possible it is suggested that a catalytic powder comprising electrode material, catalyst material and the solid-electrolyte material be produced, that a catalytic layer be produced on a carrier from the catalytic powder, that the catalytic layer be heated on a side facing away from the carrier to soften the solid-electrolyte material and that subsequently the catalytic layer be applied under pressure to the solid-electrolyte membrane while the solid-electrolyte material is still softened in order to form a composite.

18 Claims, 5 Drawing Sheets

PROCESS FOR THE PRODUCTION OF A COMPOSITE CONSISTING OF ELECTRODE MATERIAL, CATALYST MATERIAL AND A SOLID-ELECTROLYTE MEMBRANE

BACKGROUND OF THE INVENTION

The invention relates to a process for the production of a composite consisting of electrode material, catalyst material and a solid-electrolyte membrane for an electrochemical cell, in particular a fuel cell, with which solid-electrolyte material is brought into pore-deep contact with the electrode material and the catalyst material by softening it.

A process of this type is known, for example, from DE-PS 42 41 150. In the process described in this publication, solid-electrolyte material is, on the one hand, applied when dissolved in solvent and, on the other hand, the entire unit consisting of electrode material, catalyst material and solid-electrolyte membrane is then hot-pressed while it is being heated.

The disadvantage of this known solution is to be seen in the fact that the hot-pressing of the entire unit consisting of electrode material, catalyst material and solid-electrolyte membrane results in a considerable mechanical and thermal burden on the materials and, in addition, requires heating times which make an expensive process control necessary.

The object underlying the invention is therefore to improve a process of the generic type such that this can be carried out as effectively and inexpensively as possible.

SUMMARY OF THE INVENTION

This object is accomplished in accordance with the invention, in a process of the type described at the outset, in that a catalytic powder comprising electrode material, catalyst material and solid-electrolyte material is produced, that a catalytic layer is produced on a carrier from the catalytic powder, that the catalytic layer is heated on a side facing away from the carrier to soften the solid-electrolyte material and that subsequently the catalytic layer is applied to the solid-electrolyte membrane under pressure with a side facing away from the carrier while the solid-electrolyte material is still softened in order to form a composite.

The advantage of the inventive solution is to be seen in the fact that, on the one hand, the production of the catalytic layer serving as electrode in the electrochemical cell and consisting of catalytic powder can be carried out very simply and, on the other hand, this is heated up, due to the selective softening of the solid-electrolyte material incorporated in the catalytic layer, only in the volume area, in which the formation of a composite is desired. This means that due to the application of the catalytic layer with the solid-electrolyte material which is still softened to the solid-electrolyte membrane under pressure the formation of the composite between electrode material, catalyst material and solid-electrolyte membrane is carried out in a simple manner and selectively at the desired location, using the solid-electrolyte material of the catalytic powder. Furthermore, due to the efficient heating up of the catalytic layer only in the area, in which the formation of the composite is desired, the inventive process can be operated with low energy requirements and, in particular due to the locally selective effect of the energy, this energy can be used up quickly enough and so a fast and, therefore, efficient and inexpensive procedure is possible.

The energy could, from a purely theoretical point of view, also be introduced into the catalytic layer as a whole or partially by mechanical or thermal contact, i.e. heat conduction or contact with a hot gas.

Particularly in order to introduce this energy into the catalytic layer as quickly and purposefully as possible, it is more advantageous when the catalytic layer is heated by electromagnetic radiation.

This electromagnetic radiation can be of the most varied kind. For example, it would be conceivable to use a laser as a radiation source.

It is particularly advantageous when the electromagnetic radiation is infrared radiation, especially heat radiation of a heated body.

From a purely theoretical point of view, it would also be conceivable to introduce the solid-electrolyte material into the catalytic layer by means of a solvent and, for example, thereby stabilize the catalytic layer, as well.

It is, however, far more advantageous, especially in order to avoid the overall problems incurred with evaporating solvents in an inventive process, when the solid-electrolyte material is introduced into the catalytic layer exclusively free of solvents, namely as a powder.

It is also advantageous, particularly in this connection, to avoid wet binding agents and so a composite is expediently produced in the catalytic layer exclusively by mechanically pressing the catalytic powder.

In this respect, plastic material, for example PTFE (polytetrafluoroethylene), contained in the catalytic powder preferably serves as binding agent, PTFE having at the same time the additional advantage that it creates water-free areas in the catalytic layer due to its hydrophobic properties.

No details have so far been given concerning the carrier. This could be detachably connected to the catalytic layer. An advantageous solution does, however, provide for the carrier and the catalytic layer to be joined to form a unit which considerably facilitates the handling of the catalytic layer during the process.

In this respect, it is particularly advantageous when the catalytic layer is joined to the carrier exclusively by mechanical pressing.

In this respect, a carrier material is preferably designed such that it later represents a diffusion layer, the carrier material being preferably selected, particularly for gaseous electrochemical processes, such that gaseous reaction components easily diffuse through it.

The carrier preferably consists of a flexible flat material, in particular of carbon, and is, therefore, also a good electrical conductor.

In a particularly advantageous process, which is, in particular, continuous, it is provided for the carrier to be designed in the form of a tape and, in particular, for the catalytic layer to be applied to the tape-like carrier in a continuous process.

In this respect, it is particularly expedient when the tape-like carrier material runs between two rollers working in opposite directions and the catalytic layer is rolled onto the carrier material by the rollers by means of the application of catalytic powder to the carrier material.

With respect to the treatment of the solid-electrolyte membrane prior to the application of the catalytic layer, no details have been given in conjunction with the embodiments described thus far. It would, for example, be conceivable to additionally pretreat the solid-electrolyte membrane likewise by means of the application of solid-electrolyte material dissolved in solvents. It is, however, particularly advantageous when the solid-electrolyte membrane is likewise treated without solvents, particularly when the solid-electrolyte membrane does not undergo any solvent pretreatment.

In order to attain as intimate a composite as possible between the solid-electrolyte membrane and the catalytic layer, it is, where required, advantageous when the solid-electrolyte membrane is brought to a defined temperature, for example heated up, on its upper side facing the catalytic layer prior to the catalytic layer being applied. Such a selective attemperating of the solid-electrolyte membrane can be of advantage, depending on the temperature of it, in order to prevent the solid-electrolyte material hardening too quickly when coming into contact with the solid-electrolyte material of the solid-electrolyte membrane due to the lower temperature of the membrane and the cooling caused thereby so that no intimate composite results between the solid-electrolyte membrane and the catalytic layer.

The heating up of the solid-electrolyte membrane prior to application of the catalytic layer can, preferably, go so far that the solid-electrolyte membrane softens, in the extreme case will even begin to melt on its surface.

With respect to the design of the solid-electrolyte membrane itself for as efficient a process control as possible, no details have been given in conjunction with the preceding explanation of the individual embodiments. It would, for example, be conceivable in one embodiment to provide membrane pieces with the catalytic layer one after the other, whereby the provision with the catalytic layer and the production of the composite between the solid-electrolyte membrane and the catalytic layer can be carried out speedily in the inventive process.

The inventive process may, however, be used particularly expediently when the solid-electrolyte membrane is produced as a tape and when the catalytic layer is applied to this tape in a continuous process, thereby forming the composite between the solid-electrolyte membrane and the catalytic layer.

A process may be carried out particularly expediently in this case when the catalytic layer is, for its part, applied in tape form to the solid-electrolyte membrane.

A particularly advantageous process provides in this connection for the catalytic layer to be applied to the flexible carrier designed as a tape in order to form a so-called electrode tape and for this electrode tape, for its part, to be applied to the solid-electrolyte membrane designed as a tape in a continuous process, thereby forming the composite between the solid-electrolyte membrane and the catalytic layer.

No details have so far been given as to how the catalytic layer is applied to the solid-electrolyte membrane. In a particularly advantageous embodiment, for example, particularly an embodiment, in which a continuous process control is possible, the catalytic layer is applied to the solid-electrolyte membrane by rolling on, preferably by passing the catalytic layer and the solid-electrolyte membrane between two counteracting rollers.

Within the scope of the preceding description of the inventive process no details have been given as to the intended composition of the electrode material of the catalytic layer.

The electrode material of the catalytic layer is preferably carbon powder with a grain size in the range between approximately 0.03 and approximately 1 μm.

The powdery catalyst material is preferably platinum powder with a grain size of between approximately 20 and approximately 50 Angstrom units.

The solid-electrolyte material used in the catalytic layer is preferably identical to the solid-electrolyte material of the solid-electrolyte membrane and is present with a grain size of between approximately 0.5 and approximately 2 μm. An example of an inventive solid-electrolyte material is Nafion.

In addition, it is preferably provided for the catalytic powder to have a hydrophobing medium, for example PTFE, with a grain size of approximately 0.2 to approximately 1 μm.

Furthermore, it is possible to add, in addition, a pore-forming agent, for example, sugar, to the catalytic powder.

A particularly advantageous composition of the inventive catalytic powder provides, for example, for a proportion of approximately 50% of carbon, approximately 5% of platinum, approximately 20% of PTFE and approximately 25% of Nafion.

In a composite consisting of electrode material, catalyst material and solid-electrolyte membrane which can be used particularly expediently, the solid-electrolyte membrane is provided on both sides with a catalytic layer and, therefore, the composite can be utilized as a unit directly in an electrochemical cell, preferably a fuel cell.

The composite can thereby be produced by simultaneous application of the catalytic layer to both sides. It is, however, even more advantageous when the catalytic layer is first applied to one side, then to the opposite side of the solid-electrolyte membrane.

In order to produce the inventive composite consisting of electrode material, catalyst material and solid-electrolyte membrane for insertion into an inventive electrochemical cell as far as possible without extensive further treatment, it is preferably provided for the catalytic layer to be applied to the solid-electrolyte membrane in the form of individual layer sections reaching as far as an edge region of the solid-electrolyte membrane.

It is particularly expedient when the solid-electrolyte membrane is kept free of catalytic powder in its edge regions.

This may be achieved, for example, with a solid-electrolyte membrane designed as a tape in that the catalytic layer is applied between lateral edge regions of the solid-electrolyte membrane.

In order, in addition, to make it possible to have the layer regions enclosed on all sides by edge regions, it is preferable for the catalytic layer to be applied to the solid-electrolyte membrane in certain sections without forming a composite in order to form edge regions between individual layer sections. This means that the catalytic layer is applied to the solid-electrolyte membrane continuously in the longitudinal direction of the tape but the formation of a composite between the catalytic layer and the solid-electrolyte membrane in the area of the edge regions does not take place. This may be achieved, for example, in that no heating of the catalytic layer takes place in certain sections and so the solid-electrolyte material in this layer can also not melt and, therefore, the catalytic layer is merely pressed onto the solid-electrolyte membrane so that, in this region, the catalytic layer can easily be detached.

An additional mode of procedure which is particularly simple to create provides for spacers to be inserted between the solid-electrolyte membrane and the catalytic layer for the application of the catalytic layer without forming any composite so that even with continuous heating of the catalytic layer the softened, in particular molten solid-electrolyte material cannot form any connection with the solid-electrolyte membrane since the spacers are located between the two and, therefore, a connection is formed, for example, between the catalytic layer and the spacer.

In this case, it is advantageous for the catalytic layer to be removed in the regions where no composite is formed. In the simplest case, this is possible by separating the catalytic layer out in the sections where no composite is formed.

Additional features and advantages of the inventive solution are the subject matter of the following description as well as the drawings of individual embodiments.

DETAILED DESCRIPTION OF THE INVENTION

Figure 1:
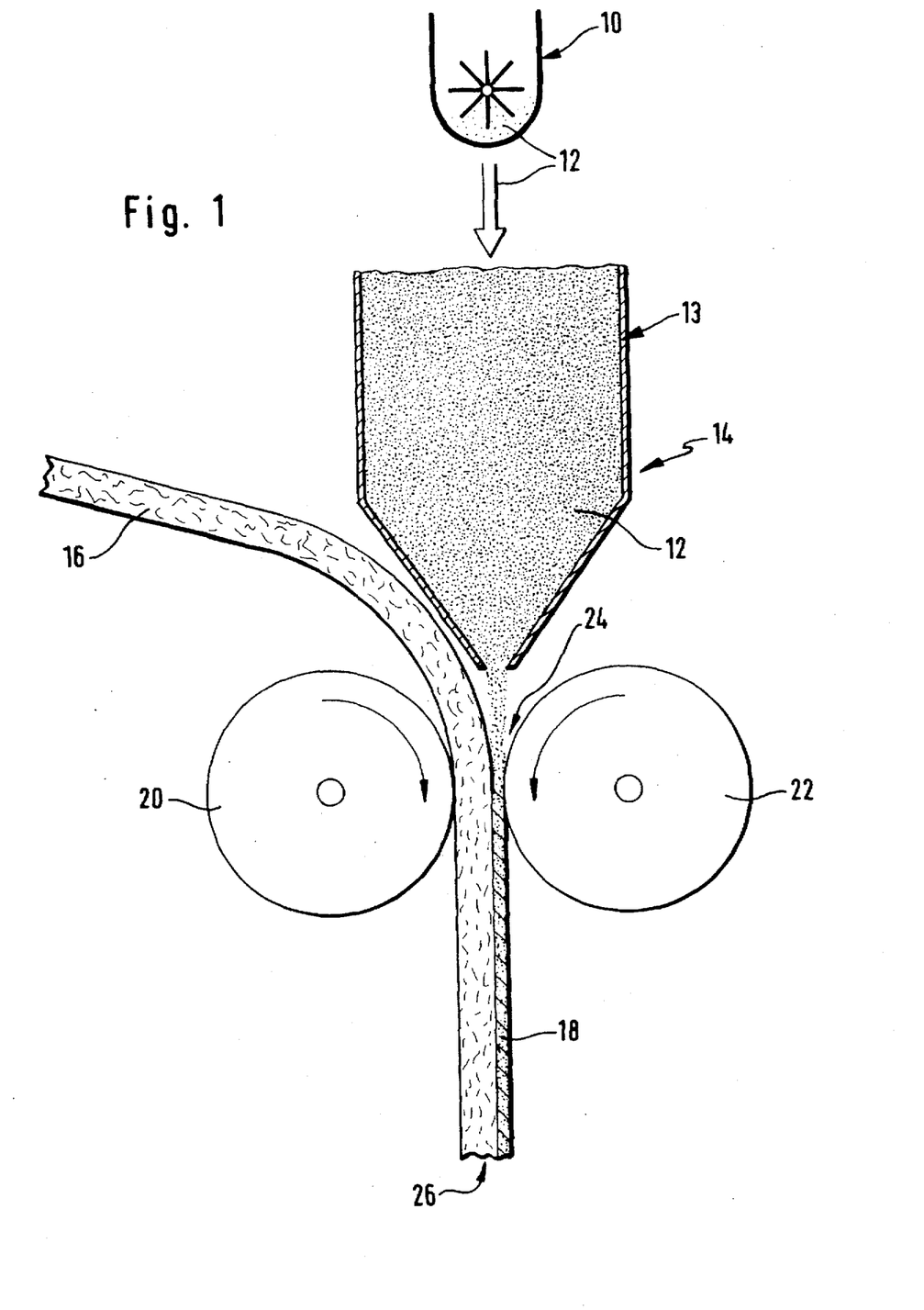
FIG. 1 is a schematic illustration of a process for the application of a catalytic layer on a carrier.

In one embodiment of the inventive process, a catalytic powder 12 consisting of a mixture of an electrically conductive material, for example carbon, a catalyst material, for example platinum, a hydrophobing agent, for example PTFE (polytetrafluoroethylene), and a solid-electrolyte material, for example Nafion (Nafion is a registered trademark of Du Pont) is produced in a blade mill 10 in a first step, illustrated in FIG. 1, and mixed together in the blade mill 10.

If required, a pore-forming agent, e.g. sugar, can be added, as well.

The catalytic powder is thereby composed, for example, of approximately 50 percent by weight of carbon particles with a grain size of between approximately 0.03 and approximately 1 µm, preferably approximately 30 nm, approximately 5 percent by weight of platinum with a grain size of the platinum particles of between approximately 20 and approximately 50 Angstrom units, preferably approximately 30 Angstrom units, approximately 20 percent by weight of PTFE powder with a grain size of between approximately 0.2 and approximately 1 µm, preferably approximately 0.5 µm, and approximately 25 percent by weight of Nafion powder with a grain size of between approximately 0.5 and approximately 2 µm, preferably approximately 1 µm.

The carbon particles are, preferably, already platinized, i.e. provided with platinum particles of the size specified in the above, the application of the platinum particles to the carbon particles being carried out in a wet chemical process.

These components of the catalytic powder are mixed together to form a homogeneous mixture in the high-speed blade mill 10 and supplied to a distributor 13 of an application device 14, with which a catalytic layer 18 with a thickness of between approximately 50 and approximately 200 µm is rolled onto a carrier 16 allowing a gas diffusion in the fuel cell, for example a carrier consisting of hydrophobized carbon paper or carbon fiber, by means of two rollers 20 and 22 arranged axis parallel and at a slight distance from one another.

In this respect, the carrier 16 abuts on the roller 20 as it runs between the two rollers 20 and 22, a gap 24 thereby forming between the carrier 16 and the roller 22, into which a quantity of catalytic powder 12 is introduced with the distributor 13 which is such that the catalytic layer 18 applied to the carrier 16 after it has passed through the two rollers 20 and 22 has the specified thickness.

The carrier 16 with the catalytic layer 18 later serving as electrode is preferably produced as a continuous tape and forms a so-called electrode tape 26 for an inventive fuel cell with a solid electrolyte.

In this electrode tape 26, the connection between the particles of the catalytic layer 18 within the same and between the catalytic layer 18 and the carrier 16 is provided purely by mechanical pressure exerted by the two rollers 20 and 22 onto the catalytic powder 12 introduced into the gap 24 and the carrier 16.

Figure 2:
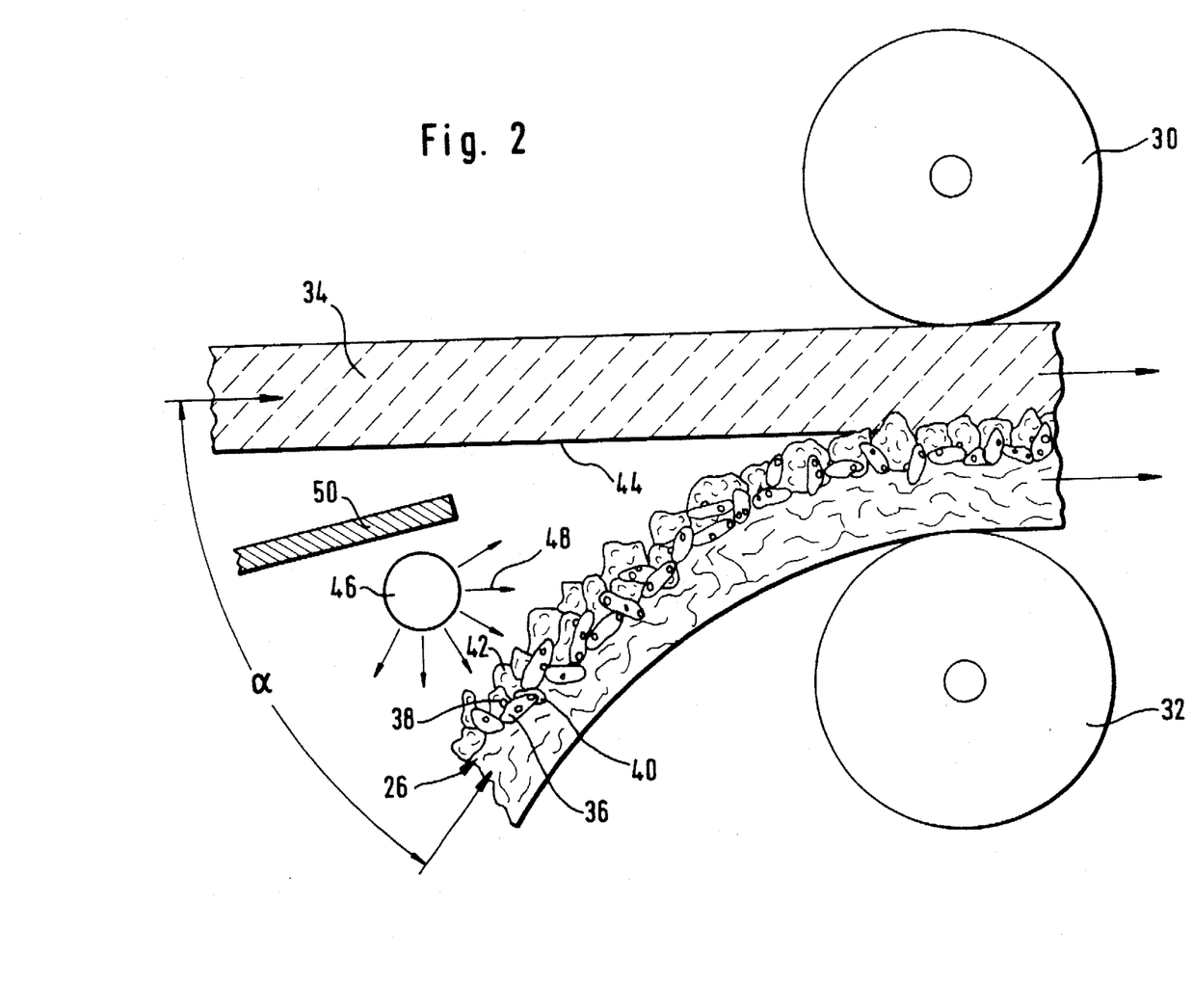
FIG. 2 is a schematic illustration of the process for the application of the catalytic layer on a solid-electrolyte membrane.

To produce a composite unit consisting of electrode and solid electrolyte for a fuel cell, a membrane 34 consisting of solid-electrolyte material, on the one hand, and, on the other hand, the electrode tape are supplied to a second pair of rollers 30 and 32 with axes extending parallel to one another, the membrane 34 abutting on the roller 30 and the catalytic layer of the electrode tape being arranged to face the membrane 34.

The catalytic layer 18 contains, as illustrated on an enlarged scale in FIG. 2, apart from carbon particles 34 which serve as electrical conductors, platinum particles 38 held thereon which serve as catalyst and the PTFE 40 bonded to the carbon as hydrophobing agent, additional particles 42 consisting of the solid-electrolyte material, for example Nafion, from which the membrane 34 is also produced.

Just before the electrode tape 26 is pressed together with the membrane 34 by the pair of rollers 30 and 32, the membrane 34 and the electrode tape 26 are guided towards one another at an angle α. Prior to the catalytic layer 18 being placed against a surface 44 of the membrane 34 facing this layer, the particles 42 of the solid-electrolyte material are heated by means of a heat source 46, for example formed by a heated filament or a different type of infrared radiator, to the glass-transition temperature due to the thermal radiation 48 emanating from the heat source, thereby preferably melting or starting to melt, and in this state are subsequently pressed onto the surface 44 of the membrane 34 by the pair of rollers 30 and 32, whereby the particles 42 of the solid-electrolyte material which have melted or started to melt are pressed onto the surface 44 or into the surface 44 of the membrane 34 together with the remaining particles of the catalytic layer 18 due to the electrode band 36 being pressed together with the membrane 34 between the rollers 30 and 32. In particular, the molten solid electrolyte generated by the particles 42 melting or starting to melt enters the spaces between the particles of the catalytic layer and therefore causes a three-dimensional three-phase boundary to result between the ion-conducting solid-electrolyte material, the catalyst and the electrically conductive material.

Furthermore, an adhesion occurs at the same time between the particles 42 of the catalytic layer 18 with one another and the membrane 34, whereby the catalytic layer 18 as a whole and, with this, the carrier 16 as well adhere to the membrane 34.

In the case where Nafion 117 is used as solid-electrolyte material, the solid-electrolyte particles 42 are heated to approximately 135° C.

Depending on whether or not the membrane 34 is intended to be likewise melted in the region of its surface 44, a heat protection shield 50 is provided between the heat source 46 and the surface 44 of the membrane 34; the degree to which the membrane 34 is heated in the region of its surface 44 can then be determined by the heat protection shield 50.

In addition, the melting depth in the catalytic layer 18, i.e. the depth, at which the particles 42 of the solid-electrolyte material in the catalytic layer 18 are still melted, can also be adjusted by way of the rotational speed of the rollers 30 and 32 and the radiation temperature of the heat source 46.

In order, in addition, to control the connection between the electrode tape 26 and the membrane 34 in a defined manner, it is provided for the rollers 30 and 32 to be attemperatable so that the hardening of the molten solid-electrolyte material during and following pressing can be adjusted via the rollers 30 and 32 by supplying or removing heat via the rollers 30 and 32.

Figure 3:
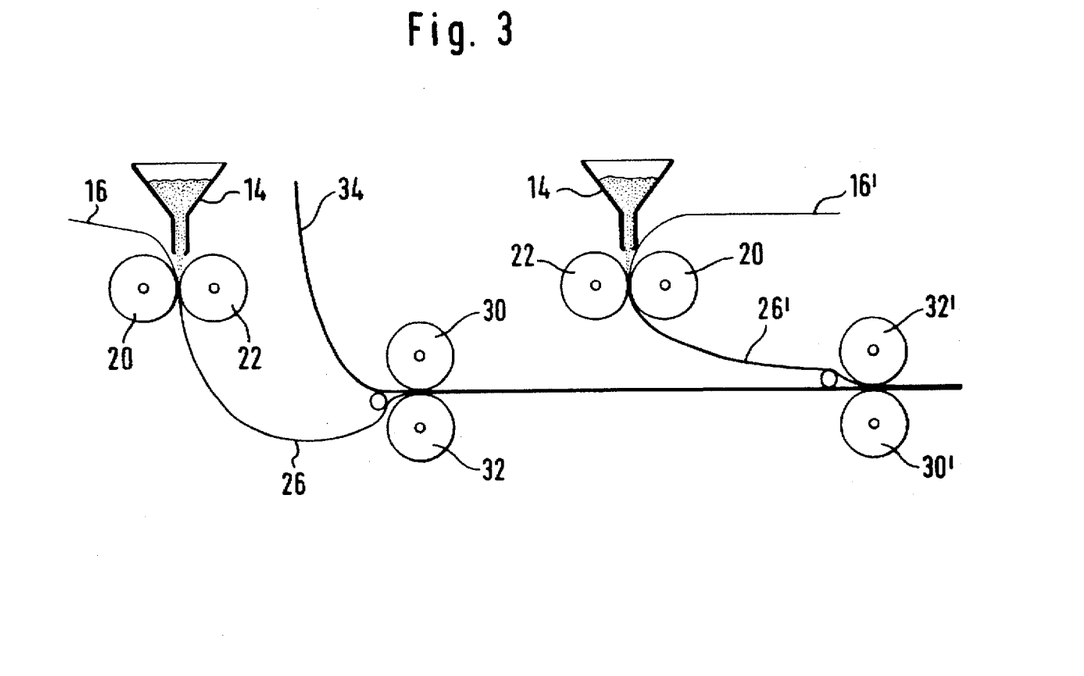
FIG. 3 is an overall illustration of the process for the application of a catalytic layer on a solid-electrolyte membrane on both sides.

In order to cover the membrane 34 on both sides with an electrode tape 26, a further pair of rollers 30', 32' is provided in addition, as illustrated in FIG. 3. Following the pair of rollers 30, 32, this pair of rollers 30', 32' provides the membrane 34, which is already provided on one side with the electrode tape 26, on the opposite side with an electrode tape 26' which is produced with an application device 14 in the same manner as the electrode tape 26 so that, in this respect, reference is made in full to the preceding comments.

Alternatively thereto, it is possible to cover the membrane 34 with the electrode tape 26 on both sides at the same time.

Figure 4:
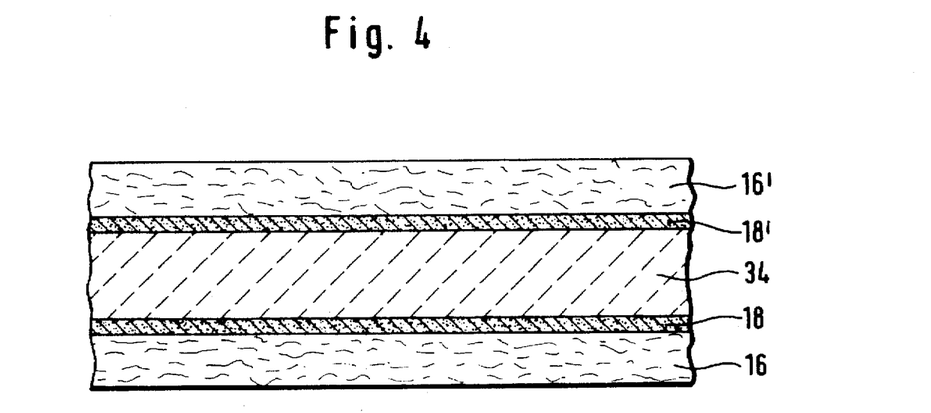
FIG. 4 is a longitudinal section through an inventive solid-electrolyte membrane.

The result of the inventive process is a composite consisting of the membrane 34 consisting of solid-electrolyte material with catalytic layers 18 and 18' intimately bonded thereto on both sides and the respective carrier 16 or 16' which is supported on the respective catalytic layer 18 or 18' and later forms the gas diffusion layer.

The inventive process therefore allows a composite consisting of membrane and electrode in the form of a continuous material strip to be produced.

Figure 5:
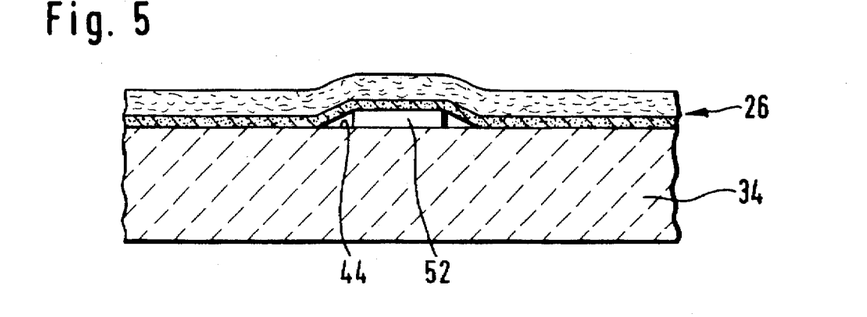
FIG. 5 is a section where no composite is formed due to an inserted spacer of the unit consisting of catalytic layer and solid-electrolyte membrane.
Figure 6:
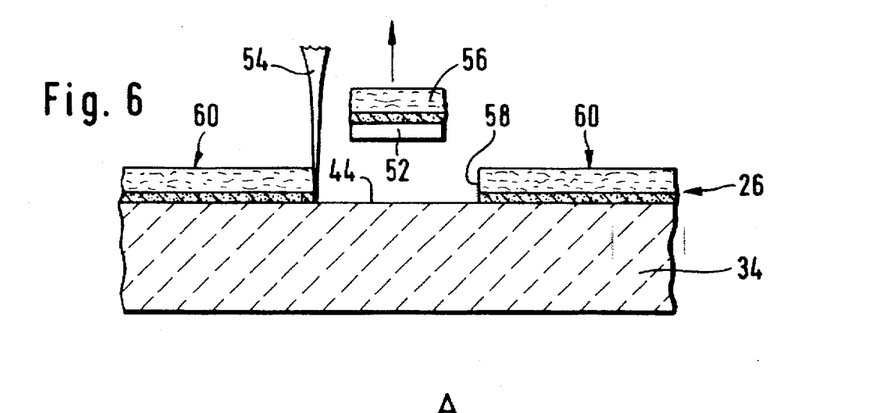
FIG. 6 is a schematic illustration of the removal of a section where no composite is formed.

Since it is necessary in the case of solid-electrolyte fuel cells to provide a seal in the region of the membrane 34 and, therefore, to produce the electrode applied to the membrane 34 in the composite with interruptions, it is, for example, provided for spacers 52 to be placed on the surface 44 of the membrane 34 during the production of the composite consisting of membrane 34 and the electrode tape 26. These spacers 52 prevent the electrode tape 26 with the particles 42 of the solid-electrolyte material which have melted or started to melt from intimately bonding with the surface 44 of the membrane 34 but rather result in the particles 42 bonding with the spacers 52 which are loosely placed on the surface 44 of the membrane 34. This means that it is possible, as illustrated in FIGS. 5 and 6, to separate out the areas of the electrode tape 26 covering the spacers 52 by means of a simple cutting procedure with a knife 54 after the electrode tape 26 has been rolled onto the membrane 34 by means of the rollers 30 and 32 and, therefore, to create edge regions 58 between two consecutive electrode regions 60, in which a direct sealing on the surface 44 of the membrane 34 is possible.

Figure 7:
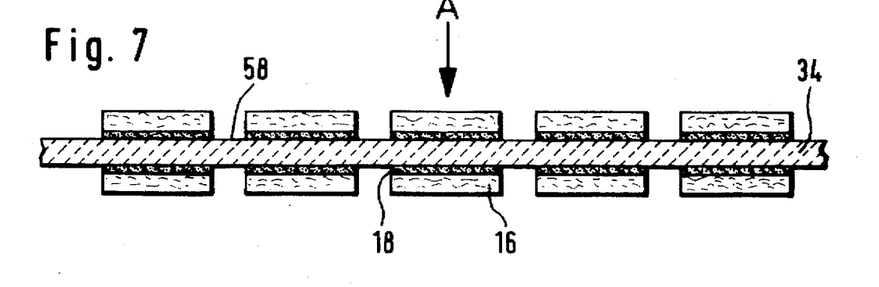
FIG. 7 is a longitudinal section through an inventive composite consisting of electrode material, catalyst material and solid-electrolyte membrane with edge regions between individual layer sections of the catalytic layer.
Figure 8:
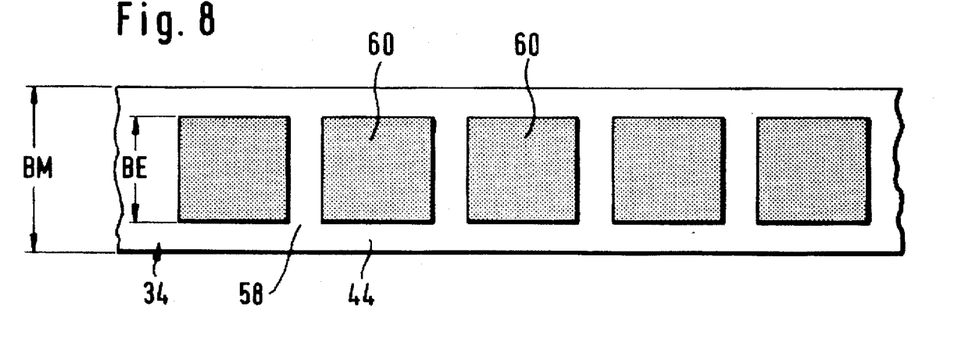
FIG. 8 is a plan view in the direction of arrow A in FIG. 7.

Furthermore, the electrode tape 26, as illustrated in FIGS. 7 and 8, is advantageously produced with a width BE which is smaller than the width BM of the membrane 34 so that when the electrode tape 26 is applied to the membrane in the center lateral edge regions 58, in which a direct sealing with the surface 44 of the membrane 34 is likewise possible around one of the electrode regions 60, remain on both sides of the electrode tape.

Figure 9:
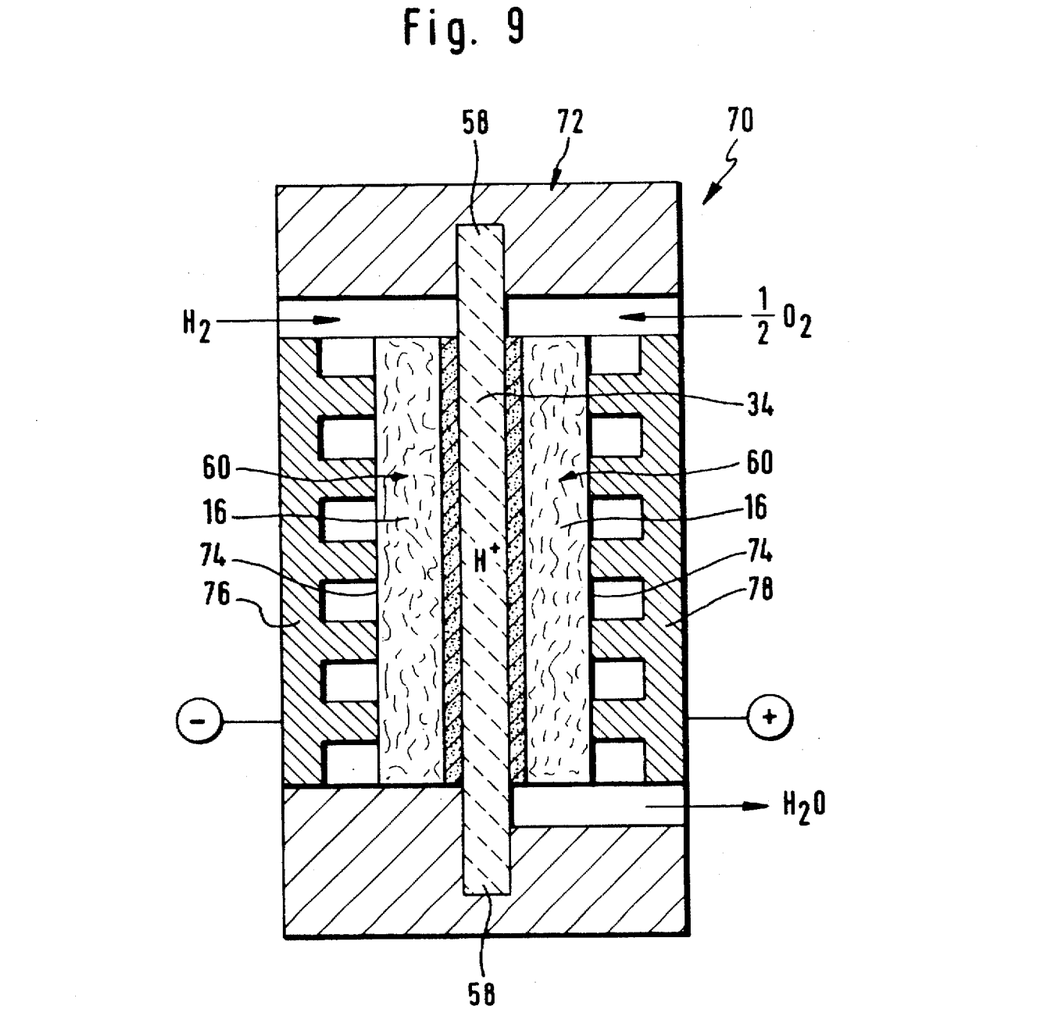
FIG. 9 is a schematic cross section through an inventive fuel cell with an inventive composite consisting of electrode material, catalyst material and solid-electrolyte membrane.

With such electrode regions 60 applied to the membrane 34, fuel cells 70 illustrated schematically in FIG. 9 can be produced. In these fuel cells the membrane 34 is sealingly held in a housing 72 with the edge regions 58 and the electrode regions 60 seated on the membrane 34 on both sides are contacted on their sides 74 facing away from the membrane 34 by current collectors 76, 78 which respectively rest on the carriers 16 which uniformly distribute the bearing pressure of the current collectors onto the catalytic layer 18 serving as electrode.

In addition, the carriers 16 allow at the same time the diffusion of $H_2$ and $O_2$ to the electrodes 18 and to the membrane 34.

The present disclosure relates to the subject matter disclosed in German application No. P 195 09 749.1 of Mar. 17, 1995, the entire specification of which is incorporated herein by reference.

What is claimed is:

1. A process for the production of a composite comprising an electrode material, a catalyst material and a solid-electrolyte membrane for an electrochemical cell, in particular a fuel cell, wherein solid-electrolyte material is brought into pore-deep contact with the electrode material and the catalyst material by softening the solid-electrolyte material, comprising the steps of:

producing a catalytic powder comprising the electrode material, the catalyst material and the solid-electrolyte material;

producing a catalytic layer on a carrier from the catalytic powder;

heating the catalytic layer on a side facing away from the carrier to soften the solid-electrolyte material; and subsequently applying the catalytic layer to the solid-electrolyte membrane under pressure while the solid-electrolyte material is still softened in order to form said composite.

2. A process as defined in claim 1, wherein:

the catalytic layer is heated by electromagnetic radiation.

3. A process as defined in claim 2, wherein:

heat radiation of a heated body is used as the electromagnetic radiation.

4. A process as defined in claim 1, wherein:

the solid-electrolyte material is introduced into the catalytic layer exclusively free of solvents.

5. A process as defined in claim 1, wherein:

a catalytic layer composite is produced in the catalytic layer exclusively by mechanically pressing the catalytic powder.

6. A process as defined in claim 1, wherein:

the carrier and the catalytic layer are joined to form a unit.

7. A process as defined in claim 6, wherein:

the catalytic layer is joined to the carrier exclusively by mechanical pressing.

8. A process as defined in claim 6, wherein:

a material for said carrier is selected such that said carrier forms a diffusion layer for reaction components of the electrochemical cell.

9. A process as defined in claim 1, wherein:

a material for said carrier is selected such that said carrier forms an electrical conductor for contacting the catalytic layer, said catalytic layer serving as an electrode.

10. A process as defined in claim 1, wherein:

the carrier is formed of a flexible flat material.

11. A process as defined in claim 10, wherein:

the carrier is designed in the form of a tape.

12. A process as defined in claim 11, wherein:

the catalytic layer is applied to the tape-like carrier in a continuous process.

13. A process as defined in claim 1, wherein:

the solid-electrolyte membrane is brought to a defined temperature on its upper side facing the catalytic layer prior to the catalytic layer being applied.

14. A process as defined in claim 1, wherein:

the solid-electrolyte membrane is used as a tape and the catalytic layer is applied thereto in a continuous process, thereby forming the composite comprising the solid-electrolyte membrane and the catalytic layer.

15. A process as defined in claim 14, wherein:

the catalytic layer is applied in tape form to the solid-electrolyte membrane.

16. A process as defined in claim 15, wherein:

the catalytic layer is applied to the carrier, said carrier being designed as a tape in order to form an electrode tape, said electrode tape being applied in a continuous process to the solid-electrolyte membrane designed as a tape, thereby forming the composite comprising the solid-electrolyte membrane and the catalytic layer.

17. A process as defined in claim 1, wherein:

the solid-electrolyte membrane is provided on both sides with a catalytic layer.

18. A process as defined in claim 1, wherein:

the catalytic layer is applied to the solid-electrolyte membrane in the form of individual layer sections reaching as far as an edge region of the solid-electrolyte membrane.

* * * * *